United States Patent
Park et al.

(10) Patent No.: US 12,434,723 B2
(45) Date of Patent: Oct. 7, 2025

(54) METHOD OF CONTROLLING CLEANING OF SENSOR UNITS

(71) Applicants: Hyundai Motor Company, Seoul (KR); Kia Corporation, Seoul (KR)

(72) Inventors: Jong Min Park, Seoul (KR); Nak Kyoung Kong, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 257 days.

(21) Appl. No.: 18/209,745

(22) Filed: Jun. 14, 2023

(65) Prior Publication Data

US 2024/0157952 A1  May 16, 2024

(30) Foreign Application Priority Data

Nov. 15, 2022 (KR) .................. 10-2022-0152164

(51) Int. Cl.
- B60S 1/54 (2006.01)
- B60S 1/56 (2006.01)
- B60W 50/02 (2012.01)

(52) U.S. Cl.
CPC .......... B60W 50/0205 (2013.01); B60S 1/54 (2013.01); B60S 1/56 (2013.01); *B60W 2050/0215* (2013.01); *B60W 2555/20* (2020.02)

(58) Field of Classification Search
CPC ......... B60W 50/0205; B60W 2555/20; B60W 2050/0215; B60S 1/54; B60S 1/56
See application file for complete search history.

(56) References Cited

U.S. PATENT DOCUMENTS

| | | | |
|---|---|---|---|
| 10,173,646 B1 * | 1/2019 | Rice | B60S 1/485 |
| 2019/0322245 A1 * | 10/2019 | Kline | B60S 1/0848 |
| 2021/0339710 A1 * | 11/2021 | Adams | G01S 15/931 |
| 2023/0011410 A1 * | 1/2023 | Bake | G01S 7/4813 |

FOREIGN PATENT DOCUMENTS

| | | | | |
|---|---|---|---|---|
| BR | 112019003150 B1 * | 6/2020 | | B60K 28/14 |
| JP | 2021-024325 A | 2/2021 | | |
| JP | 2021-509097 A | 3/2021 | | |
| KR | 2015-0126148 A | 11/2015 | | |
| KR | 2020-0040013 A | 4/2020 | | |
| KR | 2021-0119166 A | 10/2021 | | |
| WO | WO 2018-059793 A | 4/2018 | | |
| WO | WO-2021130013 A1 * | 7/2021 | | B60S 1/481 |

* cited by examiner

*Primary Examiner* — Peter D Nolan
*Assistant Examiner* — Matthew Cobb
(74) *Attorney, Agent, or Firm* — Morgan Lewis & Bockius LLP (57) ABSTRACT

A method of controlling cleaning of a sensor unit, includes determining, by a controller, whether autonomous driving is possible, determining, by a measurement unit, whether a vehicle is in a rainy environment, determining, by the controller, priorities of a plurality of sensor units according to a driving environment of the vehicle during the autonomous driving of the vehicle, setting, by the controller, the priorities of the sensor units according to the rainy environment and the driving environment of the vehicle, and pressure of air according to the driving environment, and setting a cleaning mode for determining air sprayed to each of the sensor units, and spraying air stored in an air tank to the sensor units according to the set cleaning mode.

20 Claims, 6 Drawing Sheets

METHOD OF CONTROLLING CLEANING OF SENSOR UNITS

CROSS-REFERENCE TO RELATED APPLICATION

The present application claims priority to Korean Patent Application No. 10-2022-0152164 filed on Nov. 15, 2022, the entire contents of which is incorporated herein for all purposes by this reference.

BACKGROUND OF THE PRESENT DISCLOSURE

Field of the Present Disclosure

The present disclosure relates to a method of controlling cleaning of sensor units. More particularly, it relates to a method of controlling cleaning of sensor units to set a pressure of air sprayed to each sensor unit and to spray a washer fluid in response to contamination of the sensor units for performing autonomous driving.

Description of Related Art

Conventionally, there has been a washer pump system mounted on a vehicle to selectively supply a washer fluid in a washer tank to a front windshield and a rear windshield.

Because a surface of the windshield is frequently contaminated with foreign substances such as dust, it is necessary to remove foreign substances such as dust from the glass surface to ensure a sufficient front view and promote safe driving.

To remove foreign substances on the windshield of the vehicle, the vehicle needs to be provided with a washer nozzle for spraying a washer fluid together with a wiper system.

Therefore, when the driver operates a washer switch provided in a driver seat to obtain a clear view, a washer motor connected to the washer switch operates, the washer fluid stored in a washer fluid storage tank is sprayed onto the windshield through the washer nozzle by operation of the washer motor, and the present sprayed washer fluid and wiper operation remove foreign substances that interfere with driving, and thus the driver may drive safely in a state in which visibility is ensured.

However, recently, when contaminants adhere to various devices (camera, RADAR, LiDAR, etc.) attached to the outside of the vehicle for autonomous driving, a problem occurs in measuring data for performing autonomous driving, and stability of the vehicle is greatly threatened by these devices incapable of performing measurement.

Furthermore, as various devices, the sensor units are essential components for driving the vehicle, and to prevent erroneous measurement in a rainy environment, it is necessary to remove raindrops flowing into the sensor units.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling cleaning of sensor units for controlling a pressure of air supplied according to priorities of the sensor units performing autonomous driving.

Furthermore, various aspects of the present disclosure are directed to providing a method of controlling cleaning of sensor units for setting compressed air to be sprayed in response to a driving environment of a vehicle and setting priorities of the sensor units to which the compressed air is sprayed.

The objects of the present disclosure are not limited to the above-mentioned objects, and other objects of the present disclosure not mentioned may be understood by the following description, and may be seen more clearly by the examples of the present disclosure. Furthermore, the objects of the present disclosure may be realized by means and combinations thereof indicated in the claims.

Various aspects of the present disclosure are directed to providing a method of controlling cleaning of a sensor unit, the method including determining, by a controller, whether autonomous driving of a vehicle is possible, determining, by a measurement unit, whether the vehicle is in a rainy environment, determining, by the controller, priorities of a plurality of sensor units according to a driving environment of the vehicle during the autonomous driving of the vehicle, setting, by the controller, the priorities of the sensor units according to the rainy environment and the driving environment of the vehicle, and pressure of air according to the driving environment, and setting a cleaning mode for determining air sprayed to each of the sensor units, and spraying air stored in an air tank to the sensor units according to the set cleaning mode.

In an exemplary embodiment of the present disclosure, the setting of the cleaning mode for determining air sprayed to each of the sensor units may include setting the cleaning mode to a pressure lower than a predetermined pressure value, and spraying air having the pressure lower than the predetermined pressure value to a selected sensor unit according to the priorities of the sensor units from a low-pressure tank in consideration of a speed of the vehicle.

In another exemplary embodiment of the present disclosure, the spraying of the air having the pressure lower than the predetermined pressure value may include determining whether the vehicle is stopped, spraying the air having the pressure lower than the predetermined pressure value to all the sensor units when the controller concludes that the vehicle is in a stopped state, determining whether the vehicle is driven at a speed less than a first speed when the vehicle is in the stopped state, and spraying the air having the pressure lower than the predetermined pressure value at a ratio greater than a first reference value to a sensor unit located at a front of the vehicle among the plurality of sensor units when the vehicle is driven at the speed less than the first speed, and spraying the air having the pressure lower than the predetermined pressure value at a ratio less than the first reference value to the sensor unit located at the front of the vehicle when the vehicle is driven at a speed greater than or equal to the first speed.

In yet another exemplary embodiment of the present disclosure, the determining of whether the vehicle is in the rainy environment may include filling a low-pressure tank with the air having the pressure lower than the predetermined pressure value using a compressor upon initially determining that the vehicle is in the rainy environment by the measurement unit, determining, by the measurement unit, whether precipitation is greater than or equal to a first precipitation and less than or equal to a second precipitation, determining whether a sensor unit operates normally when the precipitation is less than the first precipitation in the determining of whether the precipitation is greater than or equal to a first precipitation and less than or equal to a second precipitation, and spraying the air having the pressure lower than the predetermined pressure value once when the sensor unit does not operate normally in the determining of whether the sensor unit normally operates.

In yet another exemplary embodiment of the present disclosure, the setting of the cleaning mode for determining air sprayed to each of the sensor units may include determining, by the measurement unit, whether precipitation is greater than a second precipitation, and spraying air having a pressure higher than a predetermined pressure value to a selected sensor unit according to the priorities of the sensor units from a high-pressure tank in consideration of a speed of the vehicle when measured precipitation is greater than the second precipitation in the determining of whether the precipitation is greater than the second precipitation.

In still yet another exemplary embodiment of the present disclosure, the spraying of the air having the pressure higher than the predetermined pressure value to the selected sensor unit according to the priorities of the sensor units from the high-pressure tank may include determining whether the vehicle is stopped, spraying the same air having the pressure higher than the predetermined pressure value to all the sensor units when the controller concludes that the vehicle is in a stopped state, determining whether a speed of the vehicle is less than a second speed when the vehicle is not in the stopped state, and spraying the air having the pressure higher than the predetermined pressure value at a relatively large ratio in an order of a front side, a front-side side, a side, a rear-side side, and a rear side of the vehicle when the speed of the vehicle is greater than or equal to the second speed, and spraying the air having the pressure higher than the predetermined pressure value at a relatively large ratio in an order of the front side, the front-side side, the rear side, the rear-side side, and the side when the speed of the vehicle is less than the second speed.

In a further exemplary embodiment of the present disclosure, the spraying of the air having the pressure higher than the predetermined pressure value to the selected sensor unit according to the priorities of the sensor units from the high-pressure tank may include determining whether the sensor units are blocked, spraying the air having the pressure higher than the predetermined pressure value of maximum output to all the sensor units when the controller concludes that the sensor units are blocked, re-determining whether the sensor units are blocked, and switching to a fail-safe mode when the controller concludes that the sensor units are blocked in the re-determining of whether the sensor units are blocked.

In another further exemplary embodiment of the present disclosure, the switching to the fail-safe mode may include determining whether the autonomous driving of the vehicle is possible, and switching to a manual driving of the vehicle when the controller concludes that a driver is on board to the vehicle in a state where the autonomous driving of the vehicle is impossible, performing emergency stop when the driver is absent, and transmitting a blockage warning message of the sensor units when the controller concludes that the autonomous driving of the vehicle is possible.

In yet another further exemplary embodiment of the present disclosure, the determining of whether the autonomous driving of the vehicle is possible may include setting, by the controller, a count value according to priority of each of the sensor units, and concluding that the autonomous driving of the vehicle is impossible when a sum of count values of the sensor units measured to be blocked is greater than or equal to a preset value.

In yet another further exemplary embodiment of the present disclosure, the setting of the priorities of the sensor units according to the rainy environment and the driving environment of the vehicle, and the pressure of air according to the driving environment, and setting the cleaning mode for determining air sprayed to each of the sensor units may include compensating pressure of air set to the cleaning mode upward upon determining the driving environment in which an external temperature of the vehicle is less than or equal to a preset temperature or a speed of the vehicle is greater than a preset speed.

In still yet another further exemplary embodiment of the present disclosure, the priorities of the sensor units according to the driving environment may be compensated based on a speed of the vehicle, a lane change condition of the vehicle, a lane change direction of the vehicle, and a distance from another vehicle ahead of the vehicle.

In a still further exemplary embodiment of the present disclosure, the spraying of the air stored in the air tank to the sensor units according to the set cleaning mode may include setting pressure of the sprayed air according to a speed of the vehicle.

In a yet still further exemplary embodiment of the present disclosure, the determining of whether the autonomous driving of the vehicle is possible may include determining the priorities of the sensor units when the controller concludes that autonomous driving of the vehicle is impossible, determining whether the vehicle has been in a rainy environment, sequentially spraying air to the sensor units according to the priorities when the vehicle has been in the rainy environment, and determining whether the vehicle is currently in the rainy environment when the vehicle has not been in the rainy environment, and spraying air to a sensor unit having high priority when the vehicle is currently in the rainy environment, and spraying a washer fluid to the sensor units when the vehicle is not currently in the rainy environment.

In a yet still further exemplary embodiment of the present disclosure, the determining of whether the vehicle is currently in the rainy environment may include spraying the washer fluid and the air a set number of times according to importance of the sensor units when the vehicle is not currently in the rainy environment.

In a yet still further exemplary embodiment of the present disclosure, the determining of the priorities of the plurality of sensor units may include assigning, by the controller, weights according to the priorities of the sensor units, determining an amount of rainwater flowing into each of the sensor units to which the weights are assigned, and setting air required for the sensor units based on the weights set for the respective sensor units and the amount of rainwater flowing into each of the sensor units.

In a yet still further exemplary embodiment of the present disclosure, the determining of whether the autonomous driving of the vehicle is possible may include determining, by the controller, whether autonomous driving of a vehicle is possible, determining whether the vehicle has been in a precipitation environment, spraying compressed air to each of the sensor units according to the priorities when the vehicle is currently in the precipitation environment, determining whether the vehicle is currently in the precipitation environment when the vehicle has not been in the precipitation environment, spraying compressed air to each of the sensor units according to the priorities when the vehicle is currently in the precipitation environment, and spraying a washer fluid to each of the sensor units when the vehicle is not currently in the precipitation environment.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in more detail with reference to the accompanying drawings. The exemplary embodiments of the present disclosure may be modified in various forms, and the scope of the present disclosure should not be construed as being limited to the following embodiments. The exemplary embodiment of the present disclosure is provided to more completely describe the present disclosure to those of ordinary skill in the art.

Furthermore, a term such as " . . . unit", " . . . system", " . . . cell", etc. described in the specification means a unit that processes at least one function or operation, which may be implemented by hardware, software, or a combination of hardware and software.

Furthermore, the terms used in the specification are used only to describe specific embodiments, and are not intended to limit the embodiments. The singular expression includes the plural expression unless the context clearly dictates otherwise.

Furthermore, in the present specification, names of components are distinguished by the first, second, etc., in order to distinguish the components since the names are the same, and the order is not necessarily limited in the following description.

Furthermore, as a term used in the present specification, "saturation" means a maximum capacity for cleaning the sensor units, and the maximum capacity for cleaning is indicated by 1.

Furthermore, in the present specification, various embodiments may be implemented as software (for example, a program) including a command stored in a machine-readable storage medium which may be read by a machine (for example, a computer). The machine is a device configured for calling a stored command from the storage medium and operating according to the called command, and may include an electronic device (for example, a server) according to the disclosed exemplary embodiments of the present disclosure. An instruction may include code generated or executed by a compiler or interpreter. The machine-readable storage medium may be provided in a form of a non-transitory storage medium. Here, "non-transitory" means that the storage medium does not include a signal and is tangible, and does not distinguish that data is semi-permanently or temporarily stored in the storage medium.

Hereinafter, the exemplary embodiment of the present disclosure will be described in detail with reference to the accompanying drawings, and in the description with reference to the accompanying drawings, the same or corresponding components are provided the same reference numerals, and overlapping description thereof will be omitted.

Various aspects of the present disclosure are directed to providing a method of controlling cleaning of sensor units 500 for providing a stable driving environment by preventing contamination of a plurality of sensor units 500 of a vehicle performing autonomous driving.

There is provided a method of controlling cleaning of the sensor units 500 configured so that compressed air or washer fluid may be respectively or simultaneously sprayed to perform cleaning of the plurality of sensor units 500 mounted and positioned on the vehicle.

Figure 1:
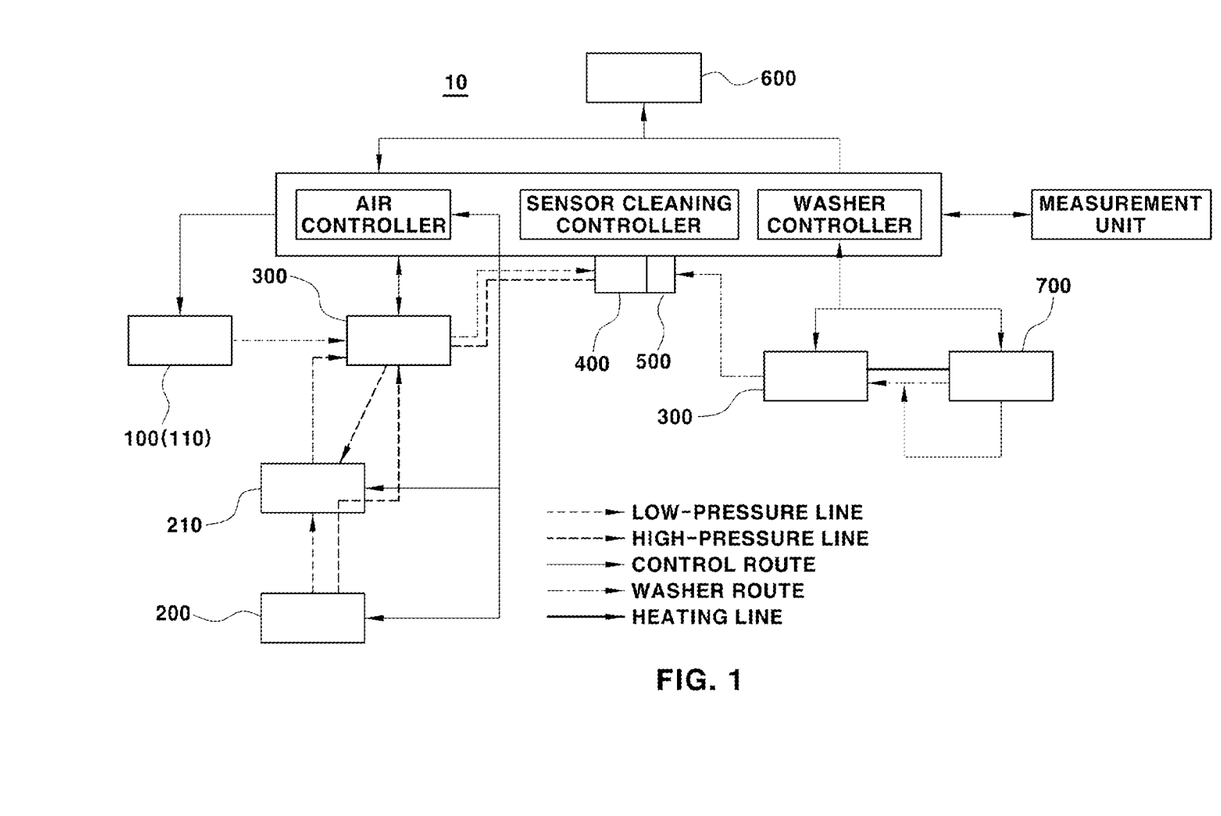
FIG. 1 illustrates a coupling relationship between components for performing a method of controlling cleaning of sensor units as an exemplary embodiment of the present disclosure.

FIG. 1 illustrates a coupling relationship between components of a cleaning system 10 for controlling cleaning of the sensor units 500 as various exemplary embodiments of the present disclosure.

As shown, in performing autonomous driving of the vehicle, the plurality of sensor units 500 configured for measuring a vehicle interval and a driving environment of the vehicle is provided. Furthermore, the plurality of sensor units 500 includes a washer fluid nozzle 400 for spraying a washer fluid and a nozzle 400 configured to spray compressed air. A low-pressure system including a low-pressure tank 110 in which air having a relatively low pressure is stored from a low-pressure pump 100 so that compressed air flows through the nozzle 400, and a high-pressure system including a high-pressure tank 210 coupled with a compressor 200 so that air having a relatively high pressure is stored therein are provided. A distributor 300 coupled to discharge ends of the low-pressure tank 110 and the high-pressure tank 210 may be configured so that compressed air is discharged through a nozzle 400 configured at a position adjacent to a sensor unit 500 selected through control of an opening amount by a controller 600.

The low-pressure pump 100 in an exemplary embodiment of the present disclosure and the low-pressure tank 110 may refer to the same component, and low-pressure air, i.e., air having a pressure lower than a predetermined pressure value may be directly applied from the low-pressure pump 100 to the distributor 300 and may flow via the low-pressure tank 110.

The distributor 300 may selectively introduce compressed air from the high-pressure tank 210 and the low-pressure tank 110, and includes at least one discharge end portion so that the introduced compressed air is discharged to the sensor units 500. Furthermore, the distributor 300 may be coupled in parallel or in series, and at least one sensor unit 500 may be coupled to the discharge end portion of the distributor 300.

The nozzle 400 may be configured at a different position according to a measurement method of the sensor unit 500. The nozzle 400 positioned adjacent to a camera may be positioned in a form of an air knife to remove contamination from a camera lens or to remove precipitation inflow. The nozzle 400 may be located on one side of the camera lens and configured at a position where compressed air is sprayed in front of the camera lens.

Alternatively, the nozzle 400 may be configured to perform cleaning of a large area of LiDAR, RADAR, etc., and may be configured at a position adjacent to one surface of the sensor unit 500 that is configured to perform measurement.

As another configuration for performing cleaning, a washer fluid system may be included. The washer fluid system includes a reservoir 700 configured to store a washer fluid, a washer fluid distributor 300 coupled to the reservoir 700, and a washer fluid nozzle 400.

In response to a request of a user or when a washer fluid spray environment is measured, the controller 600 is configured to control the distributor 300 so that the washer fluid stored in the washer fluid reservoir 700 is sprayed through the washer fluid nozzle 400 adjacent to the sensor unit 500.

The controller 600 may be configured as an integrated controller of the vehicle, and may receive external environment information from a rain sensor located inside a windshield of the vehicle. Furthermore, the controller 600 may receive contamination and cleaning request information of each sensor unit 500 based on the received external environment information and information received from the plurality of sensor units 500. As various exemplary embodiments of the present disclosure, the controller 600 may be configured to determine a degree of contamination of raindrops formed on the lens based on a photographed image of the sensor unit 500 configured as a camera, and control the distributor 300 so that compressed air and/or the washer fluid is sprayed to each sensor unit 500 based on the measured degree of contamination.

Furthermore, the controller 600 is configured to determine whether the vehicle is in a rainy environment and prioritize the plurality of sensor units 500 according to the driving environment during autonomous driving. To set priorities of the sensor units 500, the controller 600 may be configured to determine whether the precipitation flowing into each sensor unit 500 is saturated, and consider a weight of the sensor unit 500 performing autonomous driving to perform determination.

Furthermore, the priorities of the sensor units 500 may be set in consideration of the driving speed of the vehicle and the rainy environment. Furthermore, the controller 600 may set the pressure of compressed air sprayed to each set sensor unit 500, and is configured to spray compressed air to each sensor unit 500 in response to the set pressure. That is, the controller 600 is configured to set the order or priority of the sensor units 500, and to control the distributor 300 coupled to the low-pressure tank 110 or the high-pressure tank 210 so that the pressure of the sprayed compressed air is set in response to the amount of rainfall detected for each sensor. Accordingly, the controller 600 is configured to perform a control operation to spray compressed air having a separate flow rate and pressure to each sensor unit 500 in consideration of a driving speed of the vehicle and the priorities of the sensor units 500.

In various exemplary embodiments of the present disclosure, the controller 600 is configured to determine whether the vehicle is stopped, and sprays the same low-pressure air to all the sensor units 500 upon determining that the vehicle is stopped. Furthermore, when the vehicle is not in a stopped state, the controller 600 is configured to determine whether the vehicle is traveling at a speed lower than a first speed. The controller 600 may perform a control operation to spray low-pressure air at a ratio greater than a first reference value to a sensor unit 500 located at a front of the vehicle when the vehicle is traveling at a speed lower than the first speed, and to spray low-pressure air at the ratio less than the first reference value to the sensor unit 500 located at the front of the vehicle when the vehicle is traveling at a speed equal to or greater than the first speed. That is, as the driving speed of the vehicle increases, driving wind is applied to the sensor unit 500 located at the front of the vehicle. Thus, the controller 600 may spray low-pressure air at a low ratio. Furthermore, the controller 600 may perform a control operation to increase a ratio of spray of low-pressure air according to the priorities of the sensor units 500.

Furthermore, the controller 600, as a measurement unit, is configured to determine whether the vehicle is in a rainy environment based on precipitation received from a rain sensor, to determine whether each sensor unit 500 is in a normal operation state when the precipitation is less than first precipitation set in the controller 600, and to spray low-pressure air once upon determining that the sensor unit 600 does not normally operate.

That is, the controller 600 is configured to determine normal operation of the sensor unit 500 in a state in which the precipitation is relatively small, and cleans the sensor unit 500 by spraying low-pressure air when the normal operation is difficult.

Furthermore, the controller 600 is configured to spray low-pressure air to each sensor unit 500 when the measured precipitation is greater than or equal to the first precipitation and less than or equal to the second precipitation. The controller 600 may be configured to control a flow rate of the sprayed low-pressure air in response to the priority and location of each sensor unit 500.

In comparison, when precipitation information received from the measurement unit indicates that the measured precipitation is greater than the second precipitation, the controller 600 is configured to distribute relatively high-pressure compressed air from the high-pressure tank 210 to each sensor unit 500.

Furthermore, when the controller 600 sets the priorities of the sensor units 500, the priorities of the sensor units 500 may be varied in consideration of the driving speed of the vehicle, a condition for changing lanes, a direction of changing lanes of the vehicle, and a distance from another vehicle ahead of the vehicle. In various exemplary embodiments of the present disclosure, a control operation may be performed so that priority of a sensor unit 500 located on the right and rear is increased when the vehicle changes lanes to a right lane or turns right, and a sensor unit 500 located on the left and rear is increased when the vehicle changes lanes to a left lane or turns left.

Furthermore, when a request for change to a right or left lane is applied during straight-ahead driving, a control operation is performed so that priorities of sensor units 500 located on the front side and a side close to a changing lane are increased.

Accordingly, the present disclosure may set the pressure and flow rate of air sprayed to the sensor units 500 of the vehicle based on the driving speed of the vehicle, the precipitation received from the measurement unit, a driving direction of the vehicle, and the distance from the vehicle ahead. Furthermore, the priorities of the sensor units 500 may be controlled by the controller 600 so that the priorities may vary in consideration of a driving environment of the vehicle.

Figure 2:
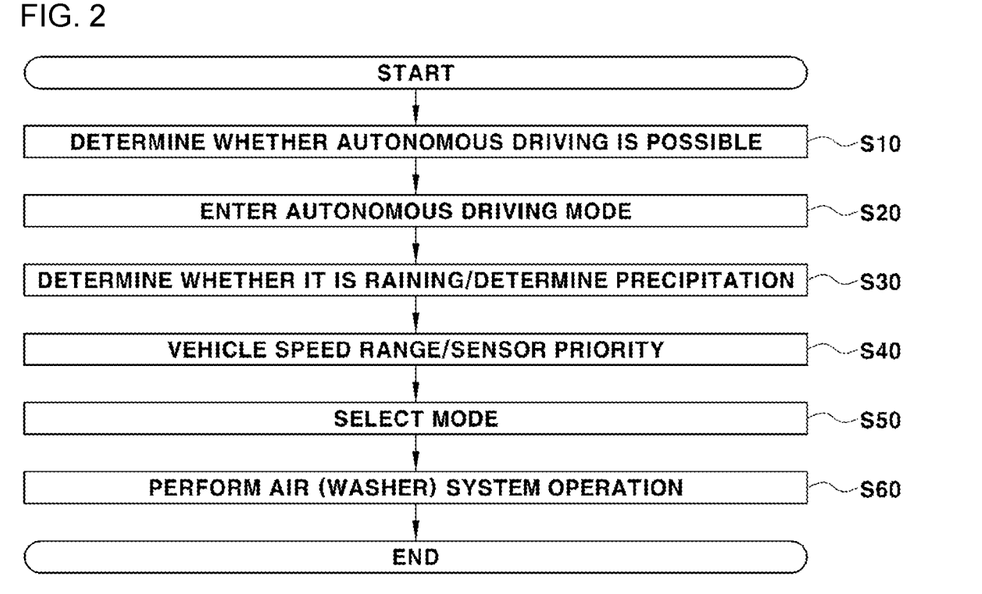
FIG. 2 illustrates a basic flowchart of the method of controlling cleaning of the sensor units as an exemplary embodiment of the present disclosure.

FIG. 2 is a flowchart of a method of controlling cleaning of the sensor units 500 as various exemplary embodiments of the present disclosure.

As shown, in performing first driving of the vehicle, a step of determining whether the autonomous driving of the vehicle is possible is included (S10).

When autonomous driving of the vehicle is possible, the vehicle enters an autonomous driving mode (S20), and the controller 600 is configured to receive data on whether it is raining and precipitation from the measurement unit (S30). Here, the case where autonomous driving of the vehicle is possible may be interpreted as including a state in which a route is set and a sensor unit for performing autonomous driving in response to route setting may be operated. Furthermore, the controller 600 may consider the driving speed and driving environment of the vehicle, and set the priorities of the sensor units 500 based thereon (S40).

A low-pressure air spray or high-pressure air spray mode is selected based on the driving environment and the driving speed of the vehicle and the priorities of the sensor units (S50). In the present way, the controller is configured to control the distributor 300 so that compressed air is sprayed to each selected sensor unit 500 (S60).

Figure 3:
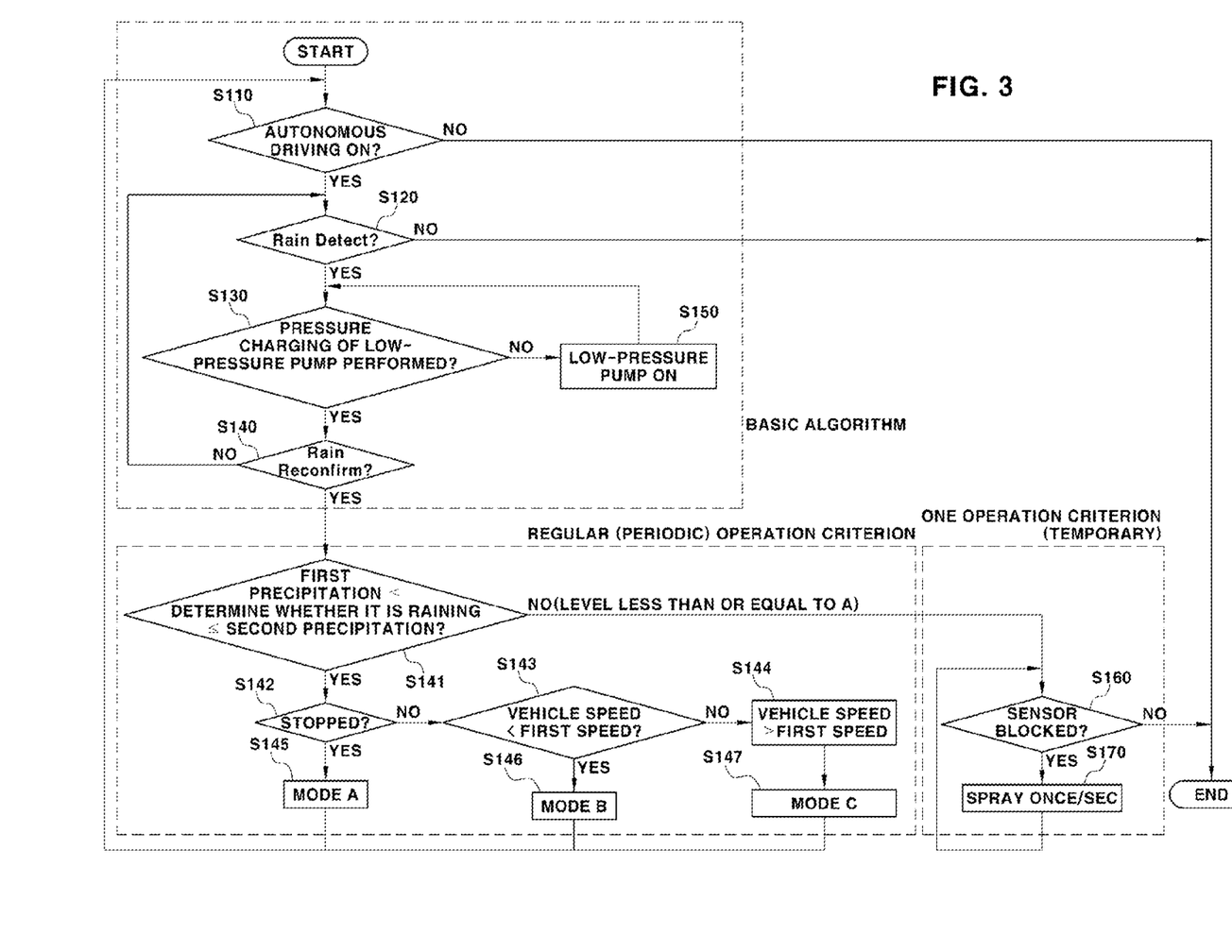
FIG. 3 illustrates a flowchart of cleaning mode setting using low-pressure air in the method of controlling cleaning of the sensor units as an exemplary embodiment of the present disclosure.

Moreover, FIG. 3 illustrates a flowchart for controlling spraying of compressed air sprayed to the sensor units 500 when the precipitation is equal to or greater than the first precipitation and less than or equal to the second precipitation in an autonomous driving state to perform an air (washer) system operation (S60) of FIG. 2.

Furthermore, in performing a cleaning step of performing the air (washer) system operation, driving output of a compressor and a washer pump may be compensated in response to the vehicle speed or an external air condition of the vehicle. As a method of compensating the driving output of the compressor and the washer pump, the controller is configured to set a duty ratio according to a speed condition and an external air temperature condition of the vehicle. When the vehicle speed is less than a minimum set value, the washer pump is operated at minimum output. When the vehicle speed is greater than or equal to the minimum set value and less than a maximum set value, the washer pump operates at output between the minimum output and maximum output. Furthermore, when the vehicle speed is equal to or greater than the maximum set value, the washer pump is operated at the maximum output.

Furthermore, when an external air temperature is less than the minimum set value, the compressor is operated at the minimum output, and when the external air temperature is greater than or equal to the minimum set value and less than the maximum set value, the compressor is operated at output between the minimum output and the maximum output. Furthermore, when the external air temperature is greater than or equal to the maximum set value, the compressor is operated at the maximum output.

Moreover, in the step of compensating the driving output of the compressor and the washer pump according to the external air temperature and vehicle speed, the driving output of the compressor and the washer pump may be compensated by the controller to be linked along a staircase, linear, logarithmic, or exponential function in response to the external air temperature and vehicle speed received by the controller.

Furthermore, when the compressor and the washer pump enter an overheating section in which the temperature is higher than a reference temperature, the controller is configured to perform a fail-safe mode to cool a driving unit. Accordingly, the driving amount of the operated compressor and washer pump is compensated in response to the external air temperature and the vehicle speed, and the driving unit is cooled to a temperature equal to or greater than the reference temperature.

As shown, when autonomous driving of the vehicle is performed for the first time (S110), a step of determining whether it is raining performed (S120). When the vehicle is determined to be in a precipitation environment, it is determined whether the low-pressure tank 110 is filled with compressed air or whether pressure-charging of the low-pressure pump 100 is performed (S130).

Upon determining that an air flow rate of sufficient pressure is applied to the low-pressure tank 110, a step of determining whether the precipitation measured in the precipitation environment is greater than or equal to the first precipitation and less than or equal to the second precipitation is performed (S140). When compressed air having a flow rate equal to or greater than the set flow rate is not applied to the low-pressure tank 110, a step of ensuring a sufficient flow rate of compressed air in the low-pressure tank 110 is performed by operating the low-pressure pump 100 (S150).

In a state in which a sufficient flow rate is applied to the low-pressure tank 110, when precipitation greater than or equal to the first precipitation is measured (S141), the controller 600 is configured to set cleaning priorities of the sensor units 500 according to the vehicle speed. Conversely, when the measured precipitation is less than the first precipitation (S141), it is determined whether the sensor units 500 are blocked (S160), and compressed air is sprayed to the sensor units 500 a set number of times to determine whether the sensor units 500 are cleaned (S170). Here, blocking of the sensor units 500 means a non-functioning state of the sensor units 500, and includes all states in which functions of the sensor units 500 cannot be performed due to contamination of the camera lens, contamination of the RADAR and the LiDAR, etc.

Moreover, when the measured precipitation is greater than or equal to the first precipitation (S141), in a process of determining the vehicle speed, in various exemplary embodiments of the present disclosure, since low-pressure air is sprayed in mode A while the vehicle is stopped (S142), the controller 600 is configured to supply the same flow rate to each sensor unit 500 (S145). Furthermore, when the vehicle speed is less than a first speed (S143), low-pressure air is sprayed in mode B, and thus the controller 600 is configured to perform a control operation to assign relatively high priority to the sensor unit 500 located at the front of the vehicle, and to supply the flow rate in the order of a front-side side, a rear side, a rear-side side, and a side (S146). Furthermore, when the vehicle speed is greater than or equal to the first speed (S144), a control operation is performed to supply and distribute a flow rate in the order of the front side, the front-side side, the side, the rear-side side, and the rear side of the vehicle in mode C (S147). The flow rate of the low-pressure air sprayed forward in mode B may mean 50% of the flow rate sprayed by the nozzle 400 through the distributor 300.

Moreover, as various exemplary embodiments of the present disclosure, mode B may mean a set value for supplying low-pressure air in the order of the front side (50%) at which the sensor unit is located, the front-side side (20%), the rear side (15%), the rear-side side (10%), and the side (5%), and mode C may mean a set value for supplying low-pressure air in the order of the front side (40%), the front-side side (30%), the side (15%), the rear-side side (10%), and the rear side (5%).

Accordingly, the controller 600 is configured to control the distributor 300 so that compressed air is sprayed to the sensor units 500 from the low-pressure tank 110 based on the precipitation and the driving speed of the vehicle.

Figure 4:
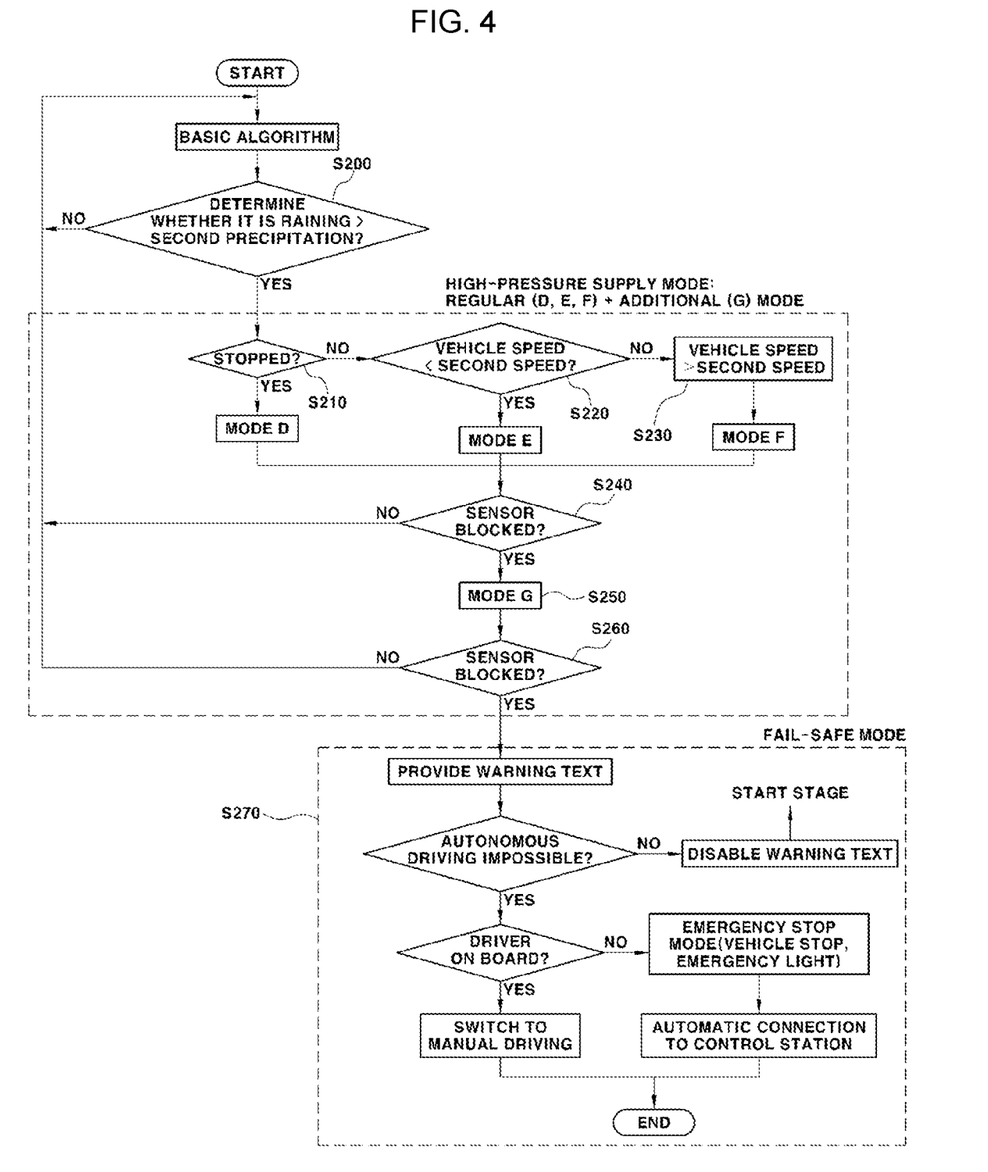
FIG. 4 illustrates a flowchart of cleaning mode setting using high-pressure air in the method of controlling cleaning of the sensor units as an exemplary embodiment of the present disclosure.

Compared to the above, FIG. 4 illustrates a flowchart in which a control operation is performed to spray compressed air from the high-pressure tank 210 as various exemplary embodiments of the present disclosure.

In FIG. 4, a basic algorithm refers to a step of determining whether or not autonomous driving is performed (S110) or a step of determining whether or not it is raining (S140) in FIG. 3.

That is, as shown, when the measured precipitation is determined to exceed the second precipitation, a control operation is performed to perform a high-pressure supply mode (S200).

In the high-pressure supply mode, the controller 600 of the vehicle is configured to perform mode D to supply the same flow rate to each sensor unit 500 when the vehicle is stopped (S210). Furthermore, when the driving speed of the vehicle is less than a second speed (S220), the controller 600 sprays high-pressure air, i.e., air having a pressure higher than a predetermined pressure value in mode E in which relatively high priority is assigned to the sensor unit 500 located at the front of the vehicle. Mode E refers to a mode in which high-pressure air is sprayed to the front side as top priority, and high-pressure air is sprayed in the order of the front-side side, the rear side, the rear-side side, and the side as secondary priorities. Furthermore, when the driving speed of the vehicle is equal to or greater than the second speed, a control operation is performed to spray high-pressure air in response to mode F (S230). Here, mode F refers to a mode in which high-pressure air is sprayed to the front side as top priority, and high-pressure air is sprayed in the order of the front-side side, the side, the rear-side side, and the side as secondary priorities.

As described above, after distributing the high-pressure air according to each mode in response to speed information of the vehicle, whether the sensor is blocked (S240) is determined. Whether the sensor is blocked (S240) is determined based on whether the sensor is inoperable. Upon determining that the sensor is blocked (S240), high-pressure air is sprayed to the sensor units in mode G (S250), and whether the sensor is blocked is re-determined (S260). In mode G, a control operation is performed to spray high-pressure air having maximum pressure to a position of the corresponding sensor determined to be blocked in a minimum cycle. In the step of re-determining whether the sensor is blocked (S260), when the sensor is determined to be blocked, the mode is switched to the fail-safe mode (S270).

Furthermore, in the step of switching to the fail-safe mode, a warning message is transmitted, and whether or not autonomous driving of the vehicle is possible is determined. In a state where autonomous driving is impossible, the vehicle is switched to manual driving when the driver is on board, and the vehicle is emergency-stopped when the driver is absent. Upon determining that autonomous driving of the vehicle is possible, a blockage warning message of the sensor unit 500 is transmitted (S270).

Furthermore, in the step of determining whether the autonomous driving of the vehicle is possible during switching to the fail-safe mode of the vehicle, the controller 600 is configured to set a count value according to the priority of each sensor unit 500 and determine that autonomous driving of the vehicle is impossible when the sum of count values of the sensor units 500 is greater than or equal to a preset value.

Accordingly, the controller 600 is configured to determine whether the sensor is blocked when the measured precipitation received from the measurement unit is less than the second precipitation, and is configured to perform a control operation to alert the driver or switch to a safe state in consideration of a drivable state of the vehicle upon determining that the vehicle is in a fail-safe state.

Furthermore, in a high-pressure spray mode, in modes D to G, a spray position for an area receiving a lot of spray interference is set in conjunction with the driving speed of the vehicle. Therefore, as the driving speed of the vehicle increases, an influence of driving wind is received in the order of the front side, the front-side side, the side, the rear-side side, and the rear side, and a high-pressure spray flow rate is controlled. Furthermore, in a high-speed driving state of the second speed or more, the high-pressure spray flow rate may be set in response to a phenomenon in which the influence of the wake (turbulence) increases, and an influence of the rear side and the rear-side side becomes larger.

Figure 5:
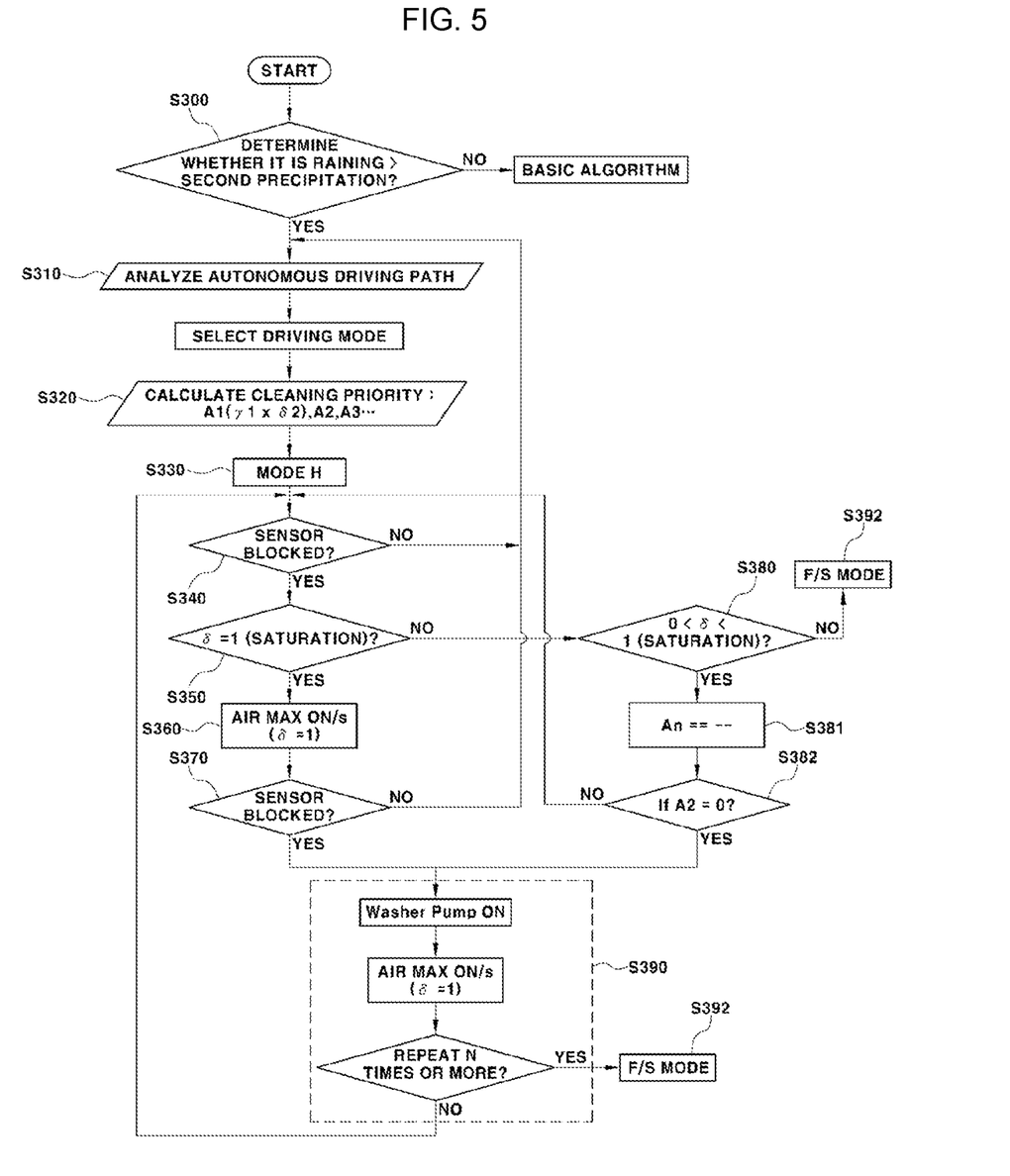
FIG. 5 illustrates a flowchart of cleaning mode setting according to priorities of the sensor units in the method of controlling cleaning of the sensor units as an exemplary embodiment of the present disclosure.

FIG. 5 illustrates, as a flowchart, a step of setting the priorities of the sensor units 500 and the air pressure according to a driving environment of the vehicle as various exemplary embodiments of the present disclosure.

Initially, the controller 600 is configured to perform a step of determining whether or not the vehicle is driven or whether the vehicle is in a rainy environment when the vehicle is stopped (S300). Upon determining that the vehicle is in a rainy environment, a step of analyzing an autonomous driving path is performed (S310), and upon determining that the vehicle is not in a rainy environment, a basic algorithm is performed. Here, the basic algorithm includes a step of determining whether or not autonomous driving is performed (S110) in FIG. 3 or a step of determining whether or not it is raining (S140).

In the step of analyzing the autonomous driving path, a driving mode is set, and cleaning priority is determined according to the set driving mode (S320). The cleaning priority (An) is a step of determining the priority of the sensor unit 500, and the cleaning priority is set in consideration of a weight ($\gamma$) of the sensor and the amount ($\delta$) of rainwater flowing into each sensor unit 500.

In various exemplary embodiments of the present disclosure, the cleaning priority is related to the driving environment and the driving direction of the vehicle. In an environment where the vehicle is driven straight ahead, priorities may be sequentially set for sensor units at the front side, one side (side including a space where the vehicle may be driven), the rear side, and a left side (side including a space where the vehicle is not driven) of the vehicle. Furthermore, when the vehicle enters a passing lane to pass a vehicle ahead, priorities are set on the rear side, the front side, a side in a passing direction, and an opposite side in the passing direction, and when the vehicle passes a side of the vehicle ahead, priorities of the sensor units are set in the order of the front side, a side adjacent to the vehicle ahead, the rear side, and a side far from the vehicle ahead. Accordingly, the priorities of the sensor units may be changed in real time in response to the driving environment of the vehicle.

As another exemplary embodiment of the present disclosure, priorities of the sensor units may be changed before and after entering a highway. Before entering the highway, the priorities of the sensor units may be set in the order of a mid-range camera, mid-range LiDAR, a wide-angle camera, a long-distance camera, and long-distance LiDAR, as a configuration of the sensor units. Conversely, when the vehicle enters the highway, the priorities of the sensor units may be set in the order of long-range LiDAR, mid-range LiDAR, a long-range camera, a mid-range camera, and a wide-angle camera. That is, while driving on the highway, information on a relatively distant object needs to be preferentially measured when compared to driving on a national road, and the priority of the sensor unit may be set according to a road environment of the vehicle.

Compressed air is sprayed to the sensor unit 500 according to the cleaning priority set in the present way. The sprayed compressed air is introduced from the high-pressure tank 210, and a control operation is performed to spray the high-pressure compressed air (S330).

Thereafter, a step of determining whether each sensor unit 500 is operated is performed to determine whether the sensor is blocked (S340).

Determining whether the sensor is blocked is determining whether an inflow of rainwater is saturated. That is, since the blocked sensor may be recognized as the same state as a rainwater saturated state, it is determined whether the inflow of rainwater of the sensor unit 500 is saturated ($\delta=1$) (S350).

In a state in which the inflow of rainwater of the sensor unit 500 is saturated, it is determined that the sensor is blocked (S350), and a control operation is performed to spray the washer fluid and maximum compressed air to a target sensor unit 500 a set number of times or more (S360). Thereafter, when the sensor continues to be blocked (S370), and when the washer fluid and maximum compressed air are sprayed to the target sensor unit 500 more than N times (S390), the sensor unit 500 switches to the fail-safe mode (S392).

Furthermore, in the step of determining whether the sensor unit 500 is saturated (S350), when the sensor unit 500 is not saturated, it is determined that the sensor unit 500 is not completely saturated with rainwater or pollution. Upon determining that complete saturation is exceeded (S380), switching to the fail-safe mode is performed (S383). Upon determining that a certain amount of rainwater has flowed into the sensor unit 500 or the sensor unit 500 is contaminated even though the sensor unit 500 is not saturated (S380), high-pressure air is sequentially reduced in ascending order of priorities of the sensor units 500 (S381).

That is, when rainwater or pollution flows into the sensor unit 500, whether the sensor unit 500 is saturated is initially determined (S350). Upon determining that the sensor unit 500 is not saturated, whether rainwater or pollution flows into the sensor unit 500 is determined (S380). Upon determining that complete saturation is exceeded, it is determined that cleaning limit performance is exceeded, and switching to the fail-safe mode is performed (S392).

Furthermore, when the high-pressure air is sequentially reduced, and when the high-pressure air flowing into a sensor unit 500 of the second highest priority (A2) is blocked (S382), the washer pump is operated, and the washer fluid and the maximum high-pressure air are sprayed to a sensor unit 500 of the highest priority (A1) N times (S390). When it is re-determined that the sensor is blocked (S391), switching to the fail-safe mode is performed (S392).

That is, after spraying the washer fluid and high-pressure air N times or more, whether or not the sensor unit is operated is determined, and switching to the fail-safe mode is performed (S392) under the condition that the sensor unit cannot be operated.

In a method of operating the washer pump, the controller is configured to set a duty ratio according to a vehicle speed condition. When the vehicle speed is less than a minimum set value, the washer pump is operated at minimum output, and when the vehicle speed is equal to or greater than the minimum set value and less than a maximum set value, the washer pump is operated at output between the minimum output and maximum output. Furthermore, when the vehicle speed is equal to or greater than the maximum set value, the washer pump is operated at the maximum output. Moreover, a step of compensating the driving output of the washer pump according to the vehicle speed may be set through a step, linear, logarithmic, or exponential function, etc.

When the washer pump operated in the instant way enters an overheating section, the fail-safe mode may be entered to cool the washer fluid.

Accordingly, FIG. 5 illustrates a control step of determining priority of a unit sensor unit included in the sensor units 500, determining the saturation amount of each sensor unit, and spraying the high-pressure air and washer fluid.

That is, In summary, in response to the precipitation, FIG. 3 illustrates control for spraying low-pressure air, and FIG. 4 includes control for spraying high-pressure air. Furthermore, FIG. 5 illustrates that whether each sensor unit is saturated is determined in response to the precipitation, and high-pressure spray is controlled based on the priority of the sensor unit during autonomous driving.

Figure 6:
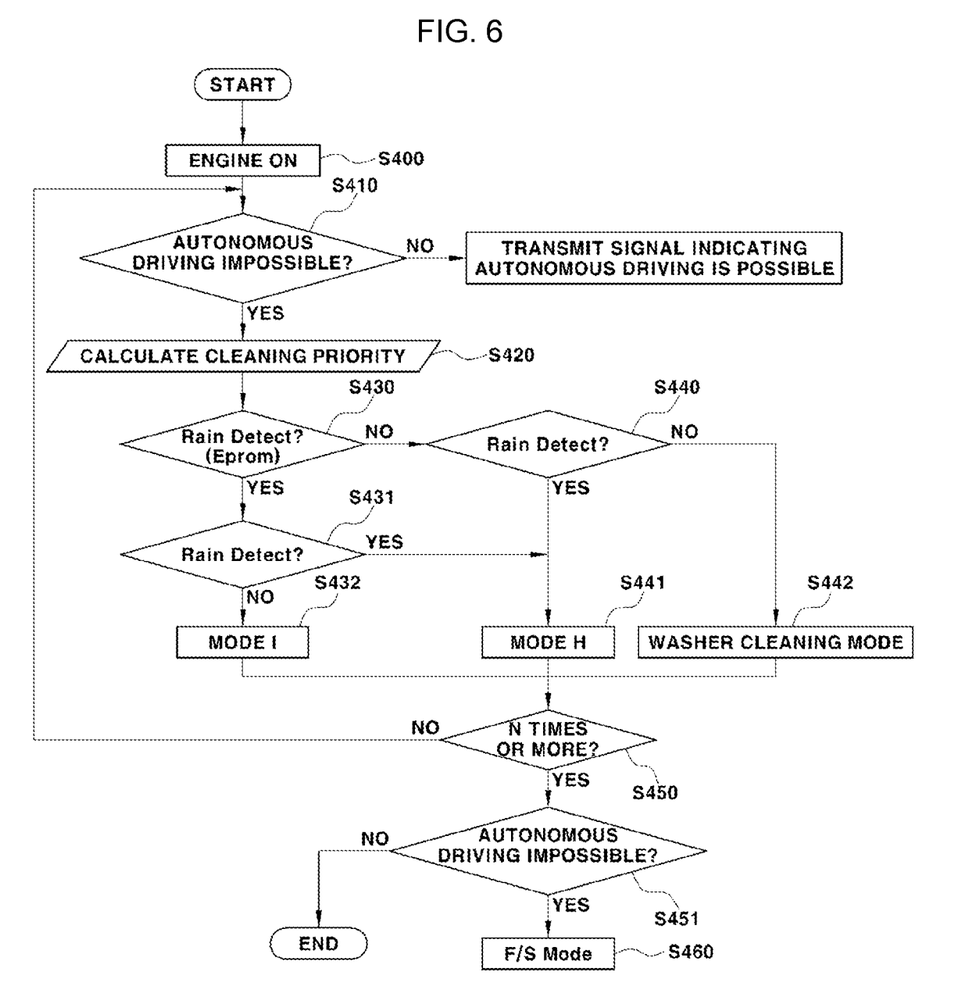
FIG. 6 illustrates a flowchart for determining whether autonomous driving is possible as various exemplary embodiments of the present disclosure.

FIG. 6 illustrates a step of determining whether autonomous driving is possible using a method for controlling cleaning of the sensor unit 500 as various exemplary embodiments of the present disclosure.

The controller 600 is configured to perform a step (S410) of determining whether or not autonomous driving is possible in a state in which an engine is turned on (S400), and is configured to perform determination ahead of the sensor unit 500 according to the cleaning priority (S420). Furthermore, the cleaning priority may be determined according to an initial set value stored in the controller 600, which has the same set value as the initially stored priority.

Thereafter, a process of determining whether or not the vehicle has been in a precipitation environment is performed (S430). That is, as data stored in the controller 600, it is determined whether a precipitation environment is recognized in a previous driving environment (S430), and whether or not it currently rains is determined (S431). When the vehicle has been in the precipitation environment, and is not currently in the precipitation environment, mode I is entered, and a control operation is performed to sequentially spray compressed air to each sensor unit 500 according to the priority of the sensor unit (S432).

On the other hand, when the vehicle has not been in the precipitation environment, it is determined whether the vehicle is currently in the precipitation environment (S440). When the vehicle is currently in the precipitation environment, as illustrated in FIG. 5, compressed air is sprayed to each sensor unit 500 according to the priority of the sensor unit according to mode H of FIG. 5 (S441).

Furthermore, when the vehicle has not been in the precipitation environment and is not currently in the precipitation environment (S440), the controller 600 is configured to determine that the sensor unit is contaminated, and is configured to perform a control operation to spray the washer fluid to each sensor unit 500 (S442).

In the present way, after the compressed air is sprayed to each sensor unit 500 in the condition of the current or past precipitation environment or the washer fluid is sprayed a set number of times or more not in the precipitation environment (S450), whether autonomous driving is possible is determined. Upon determining that autonomous driving is impossible (S451), switching to an autonomous driving fail-safe mode is performed (S460).

The autonomous driving fail-safe mode may include various methods such as sounding an autonomous driving unavailable alarm and sending a warning sound.

The present disclosure may obtain the following effects by the configuration, combination, and use relationship described above and the exemplary embodiment of the present disclosure.

Various aspects of the present disclosure are directed to providing a method of controlling cleaning of the sensor unit for providing compressed air according to priority of the sensor unit as an essential component of an autonomous vehicle, and has an effect of increasing stability of autonomous driving.

Furthermore, the compression amount of air may be selected according to various driving environments, and the flow rate of air sprayed to the sensor unit may be controlled, improving driving performance.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling cleaning of a sensor unit, the method comprising:
determining, by a controller, whether an autonomous driving of a vehicle is possible;
determining, by a rain sensor, whether the vehicle is in a rainy environment;
determining, by the controller, priorities of a plurality of cameras according to a driving environment of the vehicle during the autonomous driving of the vehicle;
setting, by the controller, the priorities of the cameras according to the rainy environment and the driving environment of the vehicle setting a pressure of air to be sprayed to each of the cameras based on the driving environment, and setting a cleaning mode for determining air sprayed to each of the cameras; and
spraying air stored in an air tank to the cameras according to the set cleaning mode,
wherein a sequence of spraying the air to the camera is determined based on a speed of the vehicle.

2. The method of claim 1,
wherein the air tank includes a low-pressure tank, and
wherein the setting of the cleaning mode for determining air sprayed to each of the cameras includes:
setting the cleaning mode to a pressure lower than a predetermined pressure value; and
spraying air having the pressure lower than the predetermined pressure value to a selected camera according to the priorities of the cameras from the low-pressure tank in consideration of the speed of the vehicle.

3. The method of claim 2, wherein the spraying of the air having the pressure lower than the predetermined pressure value includes:
determining whether the vehicle is stopped;
spraying the air having the pressure lower than the predetermined pressure value to all the cameras when the controller concludes that the vehicle is in a stopped state;
determining whether the vehicle is driven at a speed less than a first speed when the vehicle is in the stopped state; and
spraying the air having the pressure lower than the predetermined pressure value at a ratio greater than a first reference value to a camera located at a front of the vehicle among the plurality of cameras when the vehicle is driven at the speed less than the first speed, and spraying the air having the pressure lower than the predetermined pressure value at a ratio less than the first reference value to the camera located at the front of the vehicle when the vehicle is driven at a speed greater than or equal to the first speed.

4. The method of claim 1,
wherein the air tank includes a low-pressure tank, and
wherein the determining of whether the vehicle is in the rainy environment includes:
filling the low-pressure tank with air having a pressure lower than a predetermined pressure value using a compressor when the controller concludes that the vehicle is in the rainy environment by the rain sensor;
determining, by the rain sensor, whether precipitation is greater than or equal to a first precipitation and less than or equal to a second precipitation;
determining whether a camera among the plurality of cameras operates normally when the precipitation is less than the first precipitation in the determining of whether the precipitation is greater than or equal to the first precipitation and less than or equal to the second precipitation; and
spraying the air having the pressure lower than the predetermined pressure value once when the camera does not operate normally in the determining of whether the camera normally operates.

5. The method of claim 1, wherein the spraying of the air stored in the air tank to the cameras according to the set cleaning mode includes setting pressure of the sprayed air according to the speed of the vehicle.

6. The method of claim 1, wherein the determining of whether the autonomous driving of the vehicle is possible includes:
determining the priorities of the cameras when the controller concludes that the autonomous driving of the vehicle is impossible;
determining whether the vehicle has been in the rainy environment;
sequentially spraying air to the cameras according to the priorities when the vehicle has been in the rainy environment, and determining whether the vehicle is currently in the rainy environment when the vehicle has not been in the rainy environment; and
spraying air to a camera having a priority higher than a predetermined priority when the vehicle is currently in the rainy environment, and spraying a washer fluid to the cameras when the vehicle is not currently in the rainy environment.

7. The method of claim 6, wherein the determining of whether the vehicle is currently in the rainy environment includes spraying the washer fluid and the air a set number of times according to importance of the cameras when the vehicle is not currently in the rainy environment.

8. The method of claim 1, wherein the determining of the priorities of the plurality of cameras includes:
assigning, by the controller, weights according to the priorities of the cameras;
determining an amount of rainwater flowing into each of the cameras to which the weights are assigned; and
setting air required for the cameras based on the weights set for the respective cameras and the amount of rainwater flowing into each of the cameras.

9. The method of claim 1, wherein the determining of whether the autonomous driving of the vehicle is possible includes:
setting the priorities of the plurality of cameras;
determining whether the vehicle has been in a precipitation environment;
determining whether the vehicle is currently in the precipitation environment when the vehicle has not been in the precipitation environment; and
spraying compressed air to each of the cameras according to the priorities when the vehicle is currently in the precipitation environment, and spraying a washer fluid to each of the cameras when the vehicle has not been in the current precipitation environment.

10. A method of controlling cleaning of a sensor unit, the method comprising:
   determining, by a controller, whether an autonomous driving of a vehicle is possible;
   determining, by a rain sensor, whether the vehicle is in a rainy environment;
   determining, by the controller, priorities of a plurality of cameras according to a driving environment of the vehicle during the autonomous driving of the vehicle;
   setting, by the controller, the priorities of cameras according to the rainy environment and the driving environment of the vehicle, and pressure of air according to the driving environment, and setting a cleaning mode for determining air sprayed to each of the cameras; and
   spraying air stored in an air tank to the cameras according to the set cleaning mode,
   wherein the air tank includes a high-pressure tank, and
   wherein the setting of the cleaning mode for determining air sprayed to each of the cameras includes:
      determining, by the rain sensor, whether precipitation is greater than a second precipitation; and
      spraying air having a pressure higher than a predetermined pressure value to a selected camera according to the priorities of the cameras from the high-pressure tank in consideration of a speed of the vehicle when measured precipitation is greater than the second precipitation in the determining of whether the precipitation is greater than the second precipitation.

11. The method of claim 10, wherein the spraying of the air having the pressure higher than the predetermined pressure value to the selected camera according to the priorities of the cameras from the high-pressure tank includes:
   determining whether the vehicle is stopped;
   spraying the air having the pressure higher than the predetermined pressure value to all the cameras when the controller concludes that the vehicle is in a stopped state;
   determining whether the speed of the vehicle is less than a second speed when the vehicle is not in the stopped state; and
   spraying the air having the pressure higher than the predetermined pressure value at a relatively large ratio in an order of a front side, a front-side side, a side, a rear-side side, and a rear side of the vehicle when the speed of the vehicle is greater than or equal to the second speed, and spraying the air having the pressure higher than the predetermined pressure value at a relatively large ratio in an order of the front side, the front-side side, the rear side, the rear-side side, and the side when the speed of the vehicle is less than the second speed.

12. The method of claim 10, wherein the spraying of the air having the pressure higher than the predetermined pressure value to the selected camera according to the priorities of the cameras from the high-pressure tank includes:
   determining whether the cameras are blocked;
   spraying the air having the pressure higher than the predetermined pressure value of maximum output to all the cameras when the controller concludes that the cameras are blocked;
   re-determining whether the cameras are blocked; and
   switching to a fail-safe mode when the controller concludes that the cameras are blocked in the re-determining of whether the cameras are blocked.

13. The method of claim 12, wherein the switching to the fail-safe mode includes:
   determining whether the autonomous driving of the vehicle is possible; and
   switching to a manual driving of the vehicle when the controller concludes that a driver is on board to the vehicle in a state where the autonomous driving of the vehicle is impossible, performing emergency stop when the driver is absent, and transmitting a blockage warning message of the cameras when the controller concludes that the autonomous driving of the vehicle is possible.

14. The method of claim 13, wherein the determining of whether the autonomous driving of the vehicle is possible includes setting, by the controller, a count value according to priority of each of the cameras, and concluding that the autonomous driving of the vehicle is impossible when a sum of count values of the cameras measured to be blocked is greater than or equal to a preset value.

15. The method of claim 1, wherein the priorities of the cameras according to the driving environment are compensated based on the speed of the vehicle, a lane change condition of the vehicle, a lane change direction of the vehicle, and a distance from another vehicle ahead of the vehicle.

16. An apparatus for controlling cleaning of a sensor unit, the apparatus comprising:
   a plurality of cameras located in a vehicle to perform an autonomous driving of the vehicle;
   a sensor cleaning system located in each of the cameras; and
   a controller configured to set priorities of the cameras according to a rainy environment and a driving environment of the vehicle while driving of the vehicle, set a pressure of air to be sprayed to each of the cameras based on the driving environment, and determine air sprayed to each of the cameras, and operate the sensor cleaning system, and determine a sequence of spraying the air to the cameras based on a speed of the vehicle.

17. The apparatus of claim 16, wherein the sensor cleaning system includes:
   a low-pressure system for spraying air having a pressure lower than a predetermined pressure value to the plurality of cameras;
   a high-pressure system for spraying air having a pressure higher than the predetermined pressure value to the plurality of cameras; and
   a washer fluid system for spraying a washer fluid to the plurality of cameras, and
   wherein the low-pressure system and the high-pressure system are configured to spray the air having the pressure lower than the predetermined pressure value or the air having the pressure higher than the predetermined pressure value to the plurality of cameras through a nozzle.

18. The apparatus of claim 16, wherein the controller is configured to set the priorities of the cameras according to the rainy environment and the driving environment of the vehicle, and set a pressure of air sprayed to each of the cameras based on the driving environment, and to set a cleaning mode for determining an amount of air sprayed to each of the cameras.

19. The apparatus of claim 16, wherein the controller is configured to determine whether the vehicle is currently in a precipitation environment when the vehicle has not been in the precipitation environment, and to spray compressed air to each of the cameras according to the priorities when the vehicle is currently in the precipitation environment.

20. The apparatus of claim 19, wherein the controller is configured to spray a washer fluid to each of the cameras when the vehicle has not been in the precipitation environment and is not currently in the precipitation environment.

* * * * *